(12) United States Patent
Ruch et al.

(10) Patent No.: US 6,208,508 B1
(45) Date of Patent: Mar. 27, 2001

(54) SPACE-SAVING DOCKING STATION FOR VERTICALLY SUPPORTING AN OPENED NOTEBOOK COMPUTER

(75) Inventors: Mark H. Ruch, Woodlands; Philip J. Blagg, Spring; John E. Youens, Magnolia, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/211,720

(22) Filed: Dec. 14, 1998

(51) Int. Cl.[7] ....................................... G06F 1/16
(52) U.S. Cl. ................ 361/686; 361/683; 361/684; 361/685
(58) Field of Search ............................... 361/686

(56) References Cited

U.S. PATENT DOCUMENTS 5,436,792 * 7/1995 Leman et al. ................ 361/686
5,687,061 * 11/1997 Mesfin et al. ................ 361/686

* cited by examiner

Primary Examiner—Leo P. Picard
Assistant Examiner—Yean-Hsi Chang

(57) ABSTRACT

A space-saving docking station is usable to support a notebook computer docked thereto in a generally vertical, hinge-side up opened orientation on a desktop area with the computer lid display screen exposed and facing the computer user. The docking station includes a generally wedge-shaped expansion base to a front side of which the computer base housing may be electrically coupled to connect to notebook computer to desktop peripheral devices such as a keyboard and mouse, and a stand structure for supporting the expansion base, and thus the docked computer, in the space-saving vertical orientation in which the exposed notebook computer display screen is elevated relative to the desktop area and may be utilized in conjunction with the desktop keyboard and mouse.

21 Claims, 2 Drawing Sheets

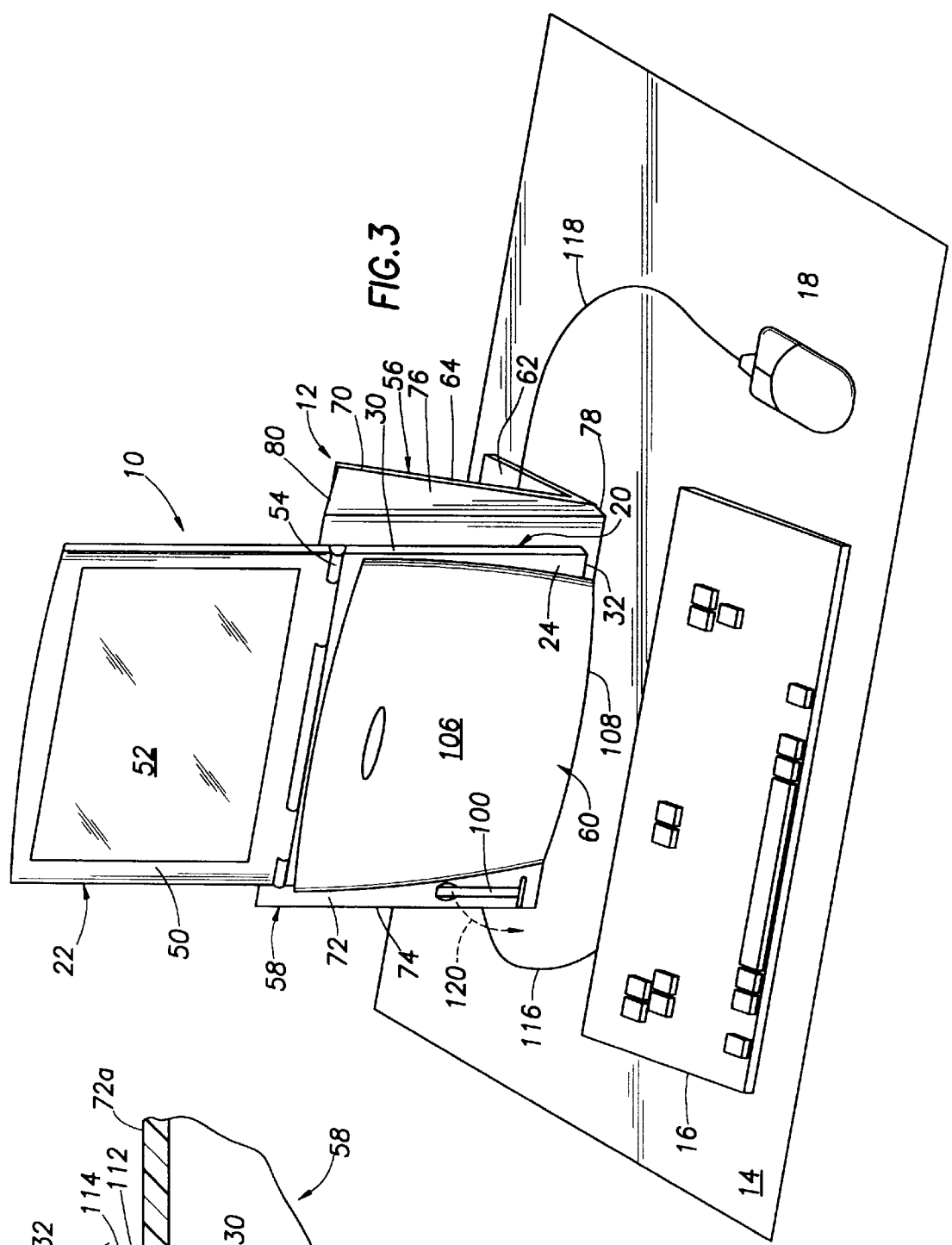
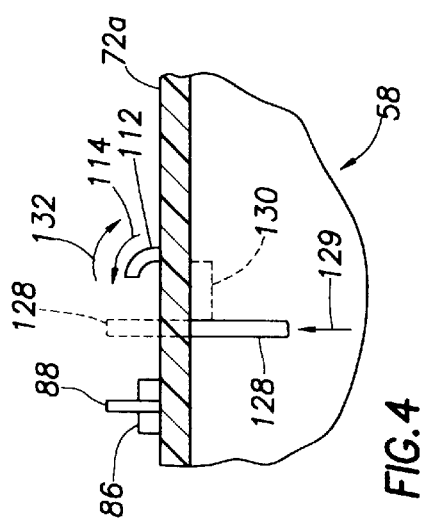

SPACE-SAVING DOCKING STATION FOR VERTICALLY SUPPORTING AN OPENED NOTEBOOK COMPUTER

BACKGROUND OF THE INVENTION

1. Field of the Invention

The present invention generally relates to computer apparatus and, in a preferred embodiment thereof, more particularly relates to docking station apparatus and associated methods for operatively coupling a portable computer, such as a notebook computer, to desktop peripheral devices such as a keyboard and mouse.

2. Description of Related Art

The increasingly popular notebook computer continues to undergo various design changes that make it smaller, lighter and, from a performance standpoint, more powerful. The intent of these design changes has been to make the notebook computer even more suitable for its "on the road" applications away from the office or home settings which are the traditional realms of considerably larger desktop computer systems.

Despite the continuing design effort to make notebook computers even more mobile, surveys indicate that notebook users spend approximately three quarters of their working time in their office environment. Because notebook computers are optimized for portability, their use in an office environment is compromised by some of the very features valued in mobility.

For example, one conventional approach to using a notebook computer in an office desktop environment is to dock the notebook to a minimal base which provides connectivity, with the user utilizing the docked notebook computer much as he would "on the road"—i.e., using the keyboard, input device and display built into the notebook computer. Unfortunately, the keyboard size/feel and the input device (usually a pointing stick or a touch pad) incorporated in many modern notebook computers have, as mentioned above, been optimized for mobility. This leads to a less than ideal office implementation where the notebook computer is typically used for lengthy work and computing periods. Simply stated, the utilization of the larger desktop keyboard and pointing device (typically a mouse) are usually considered more comfortable and easier to use for extended in-office work periods.

Thus, an office user interested in a more optimized implementation of a notebook computer typically utilizes full-sized desktop keyboard and mouse, and an external monitor, with his docked notebook computer. As is well known, this conventional hybrid portable/desktop approach to office computing tasks can undesirably take up a considerable amount of valuable desktop work space. In the past, this clutter has been mitigated somewhat by placing a monitor support over the expansion base to which the notebook computer is docked, allowing the user to support the external monitor directly over the docked computer. However, as external monitors continue to grow in both size and weight, this stacking of the monitor and docking base becomes a less and less attractive solution to the desktop clutter problem.

In view of the foregoing it can readily be seen that a need exists for improved, space-saving apparatus and methods for utilizing a portable notebook computer in conjunction with desktop peripheral devices in a desktop work environment. It is to this need that the present invention is directed.

SUMMARY OF THE INVENTION

In carrying out principles of the present invention, in accordance with a preferred embodiment thereof, specially designed space-saving portable computer docking apparatus is provided for operatively coupling a portable computer, representatively a portable notebook computer, to desktop peripheral devices, representatively a desktop computer keyboard and a desktop computer pointing device such as a mouse. Preferably, the portable computer has a base housing with a rear side edge portion to which a display screen housing is pivotally secured by a hinge structure.

In a preferred embodiment thereof, the docking apparatus includes a docking base to which at least one peripheral device may be coupled. The docking base is usable to support the computer base housing, hinge side-up, in a generally vertical orientation in which the computer is docked to the base to electrically connect the docked computer to the peripheral device(s) and the computer display screen may be upwardly pivoted to an elevated, generally vertical user viewing orientation.

Representatively, the docking base has a generally wedge-shaped configuration, and the docking apparatus includes a stand structure for generally vertically supporting the docking base on a horizontal work surface such as a desktop work area in a manner such that a major front side surface of the supported docking base faces the user. The computer base housing has a bottom side upon which a first electrical docking connector is mounted, and the front side surface of the vertically supported docking base has a second electrical docking connector disposed thereon. The second electrical docking connector is coupled to interface circuitry that permits the peripheral device(s) to be electrically coupled to the second connector.

The portable computer is docked to the base by simply placing the bottom side of the computer in an adjacent, facing relationship with the front side of the vertically supported docking base, with the first and second docking connectors appropriately aligned with one another, and then generally horizontally forcing the base housing, in the desired hinge side-up orientation, against the vertical docking base to removably mate the first and second docking connectors and couple the docked computer to the desktop peripheral device(s).

A latching structure is preferably provided for releasably locking the docked portable computer to the docking base in response to the docking operation. To unlatch the docked computer a suitable release member, representatively a manual unlatching lever, is provided on the docking base.

With the display screen lid of the docked computer upwardly pivoted to its elevated, generally vertical use orientation the computer's integral keyboard is exposed to the user. To cover the computer's now vertically oriented keyboard an optional cover panel structure is provided. The cover panel structure, in a preferred embodiment thereof, is removably securable to the docking base and vertically extends in front of and hides the computer's keyboard

BRIEF DESCRIPTION OF THE DRAWINGS

FIG. 3 is a simplified perspective view of the computer operatively supported in an opened, vertical orientation by the docking station structure; and FIG. 4 is an enlarged scale schematic cross-sectional view through a front side portion of the docking structure taken generally along line 4—4 of FIG. 1 and illustrating the operation of a computer latching part of the docking structure.

DETAILED DESCRIPTION

Figures 1, 2:
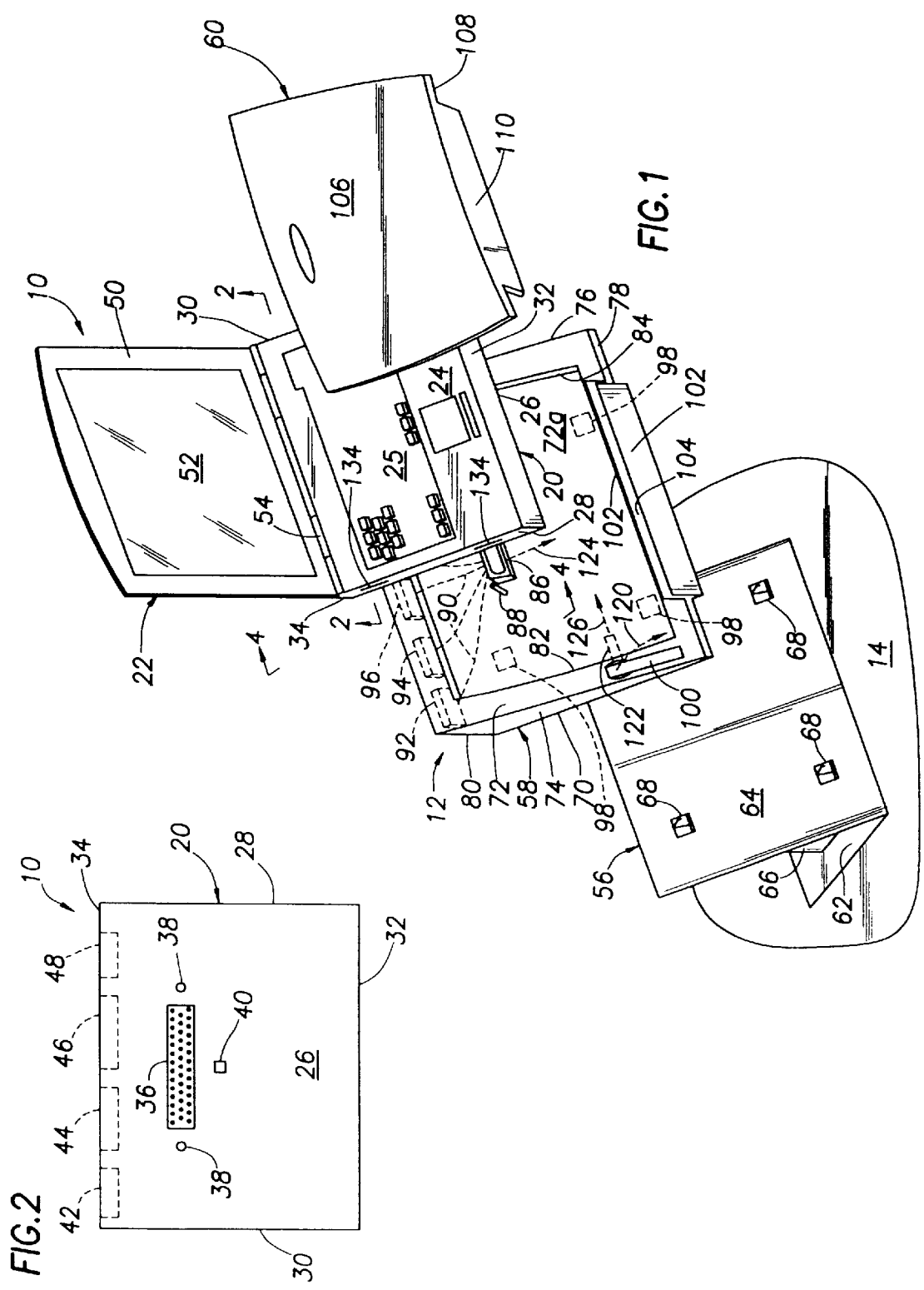
FIG. 1 is a simplified exploded perspective view of a portable notebook computer and a specially designed docking station structure embodying principles of the present invention and used to support the computer in an opened, vertical position and operatively coupled the computer to desktop peripheral devices.
FIG. 2 is a bottom plan view of the base housing portion of the computer taken along line 2—2 of FIG. 1.

Perspectively illustrated in simplified form in FIGS. 1 and 3 is a specially designed portable notebook computer 10 and associated docking station apparatus 12 which embody principles of the present invention. As will be seen, the docking station apparatus 12 uniquely supports the notebook computer 10 in a generally vertical orientation which, as later described herein, permits a unique space saving use of the computer on a desktop work area 14 in conjunction with a desktop computer keyboard 16 (see FIG. 3) and a desktop pointing device such as the illustrated mouse 18.

The notebook computer 10 includes a generally rectangular base housing 20, and a thinner, generally rectangular lid housing 22. Base housing 20 has a top side 24 with a keyboard 25 thereon, a bottom side 26, left and right ends 28 and 30, and front and rear sides 32 and 34. As illustrated in FIG. 2, the bottom side 26 of the base housing 20 has a recessed electrical connector 36 disposed thereon between a pair of guide pin holes 38, and a latching recess 40 spaced forwardly apart from the connector 36. Extending along the rear side 34 of the base housing 20 are conventional I/O port connection structures 42, 44, 46 and 48.

Lid housing 22 has a front or inner side 50 on which a display screen 52 is disposed, and is secured to a rear top side edge portion of the base housing 20, by a suitable hinge structure 54, for pivotal movement relative thereto between open positions (shown in FIGS. 1 and 2) in which the lid housing 22 is pivoted upwardly away from the top side 24 of the base housing 20 to expose the integral notebook keyboard 26 and display screen 52, and a closed position (not shown) in which the lid housing 22 extends across and covers the top side 24 of the base housing 20. Lid housing 22 is shown in FIG. 1 in a partially opened orientation in which the lid housing 22 is generally transverse to the base housing top side 24, and in FIG. 2 in a fully opened orientation in which the lid housing 22 is generally parallel to the top side 24 of the base housing 20. A suitable latch mechanism (not illustrated herein) is provided for releasably holding the lid housing 22 in its closed orientation.

Docking station apparatus 12 includes a stand structure 56, a docking or expansion base 58 and, optionally, a cover plate member 60. The stand structure 56 includes a generally planar base wall 62 horizontally restable on the desktop 14, a generally upright front support wall 64 secured to the front edge of the base wall 62 and sloped rearwardly and upwardly, and a suitable reinforcing structure 66 interposed between and secured to the walls 62,64. For purposes later described herein, the front side of the support wall has formed thereon four outwardly projecting, upwardly extending hook structures 68 (only three of which are visible in FIG. 1).

The docking base 58 has an outer housing portion having a generally rectangular bottom wall 70, a generally rectangular top side wall 72 which is sloped rearwardly and upwardly relative to the bottom wall 70, left and right ends 74 and 76, a relatively narrow front side wall 78, and a vertically wider rear side wall 80. A downwardly recessed central portion 72a of the top side wall 72 defines left and right vertical guide ledges 82 and 84 on the top side of the docking base 58. An outwardly projecting electrical connector 86 is positioned on a rear portion of the recessed wall area 72a, between two outwardly projecting guide pin members 88, and is releasably mateable with the electrical connector 36 (see FIG. 2) disposed on the bottom side 26 of the portable computer base housing 20.

The docking base connector 86 is coupled, via schematically depicted interface circuitry 90 (see FIG. 1) to various I/O connection structures 92,94,96 disposed on the rear side 80 of the docking base housing. Support recesses 98 are formed in the bottom side wall 70 of the docking base housing and are positioned and configured to releasably receive the stand structure hooks 68 as later described herein.

For purposes later described herein. A manually pivotable undocking lever 100 is supported on a left front corner portion of the docking base 58 and is used as subsequently described herein to manually undock the computer 10 from the docking base 12. A spaced pair of upstanding, parallel walls 102 are secured to the front side edge of the docking base 58 and define a mounting slot 104 therebetween (see FIG. 1).

The optional cover plate member 60 has a main body portion 106 with a bottom side edge 108 from which a transverse tab 110 projects. Tab 110 is receivable in the slot 104 to removably mount the cover plate member 60 on the docking base 58 as subsequently described herein.

Referring now to FIGS. 1–4, the overall notebook computer and docking apparatus 10,12 shown in FIG. 3 is assembled by placing the bottom side 70 of the docking base 58 against the sloped support wall 64 in a manner such that the hooks 68 (see FIG. 1) enter the associated support recesses on the bottom side 70 of the docking base 58 and thereby generally vertically support the docking base 58 on the desktop 14 with the top side 72 of the docking base facing forwardly. Next, to operatively dock the notebook computer 10 on the vertically supported base 58, the computer base housing 20 is placed in the recessed base area 72a which is configured to complementarily receive a bottom side portion of the base housing. As the base housing 20 enters the recessed base area 72a, the front edge of the recessed area 72a engages the front side 32 of the base housing 20, and the left and right guide ledges 82,84 of the recessed area 72a respectively engage the left and right ends 28,30 of the base housing, thereby respectively aligning the docking base connector 86 and guide pins 88 (see FIG. 1) with the connector 36 and guide pin holes 38 (see FIG. 2) on the bottom side 26 of the base housing 20

The user then simply pushes the computer 10 toward the facing side 72 of the base 58 to sequentially cause the guide pins 88 to enter the guide pin holes 38, and the connectors 36,86 to be releasably mated. As the computer base housing 58 moves toward the side 72 of the docking base 58, a spring-loaded latch hook member 112 (see FIG. 4) resiliently snaps into the facing recess 40 (see FIG. 2), as indicated by the arrow 114 in FIG. 4, to thereby releasably lock the now docked computer 10 to the expansion base 58. The docking of the computer 10 to the expansion base 58 electrically couples the internal computer electronics to the expansion base I/O connection structures 92,94,96 via the mated connectors 36,86 and the schematically depicted interface circuitry 90.

Either before or after this docking operation, the lid housing 22 of the computer 10 is pivoted upwardly to its FIG. 3 fully opened orientation, and the desktop keyboard 16 and mouse 18 are appropriately coupled to the docked computer 10 by cables 116,118 (see FIG. 3). As can be seen in FIG. 3, the docked base housing 20 and its fully opened lid housing 22 are generally vertically oriented on the desktop 14, with the computer keyboard 25 and the exposed display screen 52 forwardly facing the user of the computer 10. To cosmetically cover the computer keyboard 25 (which, with the computer docked, is replaced by the larger desktop keyboard 16), the body portion 106 is placed over the computer keyboard 25 by simply inserting the tab 110 of the cover plate member 60 (see FIG. 1) into the slot 104 at the now bottom edge 78 of the docking base 58.

As can be readily seen in FIG. 3, the vertically oriented docked notebook computer, with its hinge side-up base housing 20 and elevated display screen 52 requires only a very small area of the desktop area 14 as compared to the conventional approach of horizontally docking a closed notebook computer and utilizing a large desktop monitor. This advantageously permits the use of the integral computer display screen 52, which typically is better suited to office use than the keyboard and pointing device portions of the computer, in conjunction with the larger desktop keyboard 16 and mouse 18. Not only does this unique vertical docking orientation of the notebook computer 10 save considerable desktop space, but it also comfortably places the computer display screen 52 in a more elevated orientation that if the computer 10 were simply placed horizontally on the desktop area 14.

The expansion base undocking lever member 100 shown in FIGS. 1 and 3 may be manually pivoted outwardly from its solid line position, as indicated by the arrow 120, to undock the computer 10 and permit its removal from the vertically supported docking base 58. However, this undocking movement of the latch member 100 is initially prevented by a schematically depicted movable blocking member 122 disposed within the docking base 58 and normally positioned to block the outward pivotal movement of the lever member 100. When it is desired to undock the computer 10, a conventional software program within the computer, upon receipt from the user of an undocking input signal, verifies that the computer is ready (from a data and program standpoint) to safely be undocked, and then outputs an undocking readiness signal 124 which (for example, via a solenoid connected to the movable member 122) causes the blocking member 122 to move out of blocking engagement with the undocking lever 100 (as indicated by the arrow 126) and permit the lever 100 to be pivoted outwardly as indicated by the arrow 120.

Referring now to FIG. 4, the undocking lever 100 is suitable linked to an ejection member 128 disposed within the interior of the docking base 58 beneath a suitable opening in its recess wall 72a. In response to outward pivoting of the lever 100, the ejection member 128 is moved upwardly through the overlying wall opening (as indicated by the arrow 129) from the FIG. 4 solid line position of the ejection member 128 to its dotted line position in which it projects upwardly beyond the recess wall 72a. As schematically indicated at 130 in FIG. 4, the ejection member 128 is mechanically linked to the latch member 112 in a manner such that as the ejection member 128 is driven upwardly, it first causes the latch member 112 to pivot as indicated by the arrow 132 to release the base housing 20, and then engages and upwardly moves the base housing 20 away from the recess wall 72a to decouple the connectors 36,86 and permit the computer to be removed from the docking base 58.

In addition to providing substantial desktop area space saving, the representatively illustrated vertical docking station apparatus of the present invention provides a variety of other advantages compared to conventional horizontal docking apparatus. For example, the vertical docking of the computer allows the user easier access to I/O cabling on the expansion base, allows the docked notebook computer to be utilized as an integrated presentation tool (an A/C "luggable" system) by removing the expansion base and docked computer from the stand structure, and improves the potential thermal performance of the computer while docked since the computer is used in its opened configuration. Moreover, the vertically oriented docked computer allows the user convenient access to side-loading modules (via, for example, the base housing left end wall slots 134) as opposed to the less desirable front side wall positioning of such module access incorporated in many conventional dockable notebook computers.

Finally, the positioning of the computer docking connector 36 on the bottom side 26 of the computer base housing 20 provides a variety of advantages over the traditional rear side placement of such connector. For example, the bottom side placement of the notebook connector allows docking connector signals to be routed away from the display signals, and provides less "cross-talk", thereby allowing for potentially higher frequency performance, simplifies the design of thermal support of the computer while docked. It also simplifies the design of thermal support of the computer while docked, frees up space on the back side of the computer, already at a premium to support the various market-required connectors, and allows for convenient access to the connectors on the back of the docked computer.

The foregoing detailed description is to be clearly understood as being given by way of illustration and example only, the spirit and scope of the present invention being limited solely by the appended claims.

What is claimed is:

1. A method of utilizing a portable computer having a base housing with a rear side edge portion to which a display screen housing is pivotally secured by a hinge structure, said method comprising the steps of:

supporting said base housing on a wedge-shaped docking stucture that may be coupled to an inclined support of a support structure, the base housing being supported hinge-side up, in a generally vertical orientation;

electrically coupling said portable computer to at least one peripheral device; and pivoting said display screen about the hinge structure to a generally vertical user viewing orientation.

2. The method of claim 1 wherein said electrically coupling step includes the step of electrically coupling said portable computer to a desktop peripheral device.

3. The method of claim 1 wherein said electrically coupling step includes the step of electrically coupling said portable computer to a desktop computer keyboard.

4. The method of claim 1 wherein said electrically coupling step includes the step of electrically coupling said portable computer to a desktop computer pointing device.

5. The method of claim 1 wherein said method is performed using a portable notebook computer.

6. Computer apparatus comprising:

a portable computer having a base housing to which a display screen housing is pivotally secured by a hinge structure disposed adjacent a rear side edge of said base housing;

a docking structure having a general wedge shape; and a support structure having an inclined front support wall against which the docking structure is mounted, wherein said portable computer may be releasably docked to the docking structure to electrically couple it to a peripheral drive, said docking structure and said support structure being operable to support the base housing of the docked portable computer in a generally vertical, hinge-side-up orientation in which said display screen housing may be pivoted to a generally upright elevated user viewing orientation.

7. The computer apparatus of claim 6 wherein said portable computer is a portable notebook computer.

8. Computer apparatus comprising:
a portable computer having a base housing to which a display screen housing is pivotally secured by a hinge structure disposed adjacent a rear side edge of said base housing, said portable computer having a first electrical docking connector thereon;
a docking structure for operatively coupling said portable computer to at least one peripheral device, said docking structure having a general wedge-shape configuration and a second electrical docking connector to which said first electrical docking connector may be releasably mated; and
a support structure having an inclined front support wall operative to hold said docking structure in an orientation in which, with said portable computer operatively docked to said docking structure, said base housing is generally vertically oriented, hinge side up, to permit said display screen housing to be pivoted to an elevated, generally vertical user view orientation.

9. The computer apparatus of claim 8 wherein said support structure is releasably connectable to said docking structure.

10. The computer apparatus of claim 8 wherein:
said portable computer has a bottom side with a first electrical docking connector thereon, and
said docking structure has a vertically orientable side portion having a second electrical docking connector disposed thereon and releasably mateable with said first electrical docking connector in response to operatively placing said bottom side of said portable computer against said side portion of said docking structure.

11. The computer apparatus of claim 10 further comprising a latch structure carried by said docking structure and operable to releasably lock said portable computer to said docking structure.

12. The computer apparatus of claim 11 wherein said latch structure is carried on said side portion of said docking structure.

13. The computer apparatus of claim 11 further comprising a release member carried by said docking structure and being manually operable to unlatch said portable computer from said docking structure.

14. The computer apparatus of claim 8 wherein:
the vertically docked portable computer has an exposed keyboard, and
said computer apparatus further comprises a cover member associated with said docking structure and operative to cover said exposed keyboard.

15. The computer apparatus of claim 14 wherein said cover member is a cover panel removably securable in a generally vertical orientation to said docking structure.

16. A method of electrically coupling a portable computer to a peripheral device, the portable computer having a base housing to which a display screen housing is pivotally secured by a hinge structure disposed adjacent a rear side edge of the base housing, and a first electrical docking connector, said method comprising the steps of;
providing a docking structure having a second electrical docking connector thereon to which the first electrical docking connector may be releasably mated to dock the portable computer, said second docking connector being electrically connectable to the peripheral device;
releasably mounting said docking structure to a support structure along a generally inclined support wall;
docking the portable computer, by releasably mating the first and second electrical docking connectors, in a manner positioning the base housing of the portable computer against said docking structure in a generally vertical, hinge side-up position in which said display screen housing may be pivoted about the hinge structure to a generally upright position; and
pivoting said display screen housing to a generally upright elevated user viewing orientation.

17. The method of claim 16 wherein:
the supported docking structure has a generally vertical side surface upon which said second electrical docking connector is disposed, and
said docking step includes the step of pressing a bottom side portion of the portable computer against said generally vertical side surface.

18. The method of claim 16 wherein said method is performed using a portable notebook computer.

19. Docking apparatus for electrically coupling a portable computer to at least one peripheral device, the portable computer having a base housing having a bottom side and a rear edge portion, and a display screen housing pivotally secured to the base housing by a hinge structure disposed adjacent the rear edge portion of the base housing, the portable computer further having a first docking connector thereon, said docking apparatus comprising:
a docking base structure having a general wedge shape and a facing side against which the bottom side of the base housing may be placed, hinge-side up, to dock the portable computer to said docking base structure at a docked position, said docking base structure further having a second docking connector positioned thereon to be releasably mated with the first docking connector when the portable computer is docked to said docking base structure, said docking base structure being configured to allow the display screen housing to pivot about the hinge structure to a desired orientation while the portable computer is docked at the docked position; and
a support structure placeable on a generally horizontal surface, the support structure having an inclined front support wall able to orient said docking base structure in a manner such that said facing side of said docking base structure is generally vertically oriented, wherein the docking base structure is releasably mounted to the support structure.

20. The docking apparatus of claim 19 wherein said docking apparatus is usable with a portable notebook computer.

21. Computer apparatus comprising:
a portable computer having a base housing with a top side, a bottom side with a first docking connector thereon, a rear side edge portion, and a display screen lid housing pivotally secured to said rear side edge portion by a hinge structure;
a docking structure having a generally wedge-shaped configuration for operatively coupling said portable computer to a desktop peripheral device, said docking structure having interface circuitry to which the desktop peripheral device may be electrically coupled, and a generally upright support wall upon which is disposed a second docking connector coupled to said interface circuitry; and a support structure having an angled support member to which the docking structure is mounted, said portable computer being dockable to said docking structure in a generally vertical orientation by placing said base housing bottom side against said generally upright wall and generally horizontally mating said first and second docking connectors.

* * * * *